UNITED STATES PATENT OFFICE.

MAXIMILIAN JOSEF HARTUNG, OF SYDNEY, NEW SOUTH WALES.

PROCESS OF CHLORIDIZING GOLD ORES.

SPECIFICATION forming part of Letters Patent No. 471,423, dated March 22, 1892.

Application filed October 13, 1890. Serial No. 367,990. (No specimens.)

*To all whom it may concern:*

Be it known that I, MAXIMILIAN JOSEF HARTUNG, analytical chemist and metallurgist, a subject of the Emperor of Germany, residing at Sydney, in the British Colony of New South Wales, have invented new and useful improvements in the treatment of metalliferous materials and ores for the production of plumbic salts and chlorine and the extraction of gold, of which the following is a specification.

This invention relates to improvements in the treatment of metalliferous materials and ores for the production of plumbic salts and chlorine and the extraction of gold, and principally to the extraction of gold from such metalliferous materials or ores, such ores as contain sulphides of iron, copper, lead, zinc, arsenic, or antimony, or two or more of such sulphides and carbonates of lime, magnesia, baryta, or strontia, and from other such like matrices of the precious metal.

By this invention plumbates of the alkaline earth may be produced on a large scale, and from such plumbic salts chlorine may be economically produced; but it has been especially devised so that chlorinization of the gold in metalliferous materials or ores, as aforesaid, may be effected by simple chemical reactions in a thorough and economical manner.

These improvements in the treatment of metalliferous materials and ores for the production of plumbic salts and chlorine and the extraction of gold, &c., consist, first and essentially, in the chlorinization of the precious metal in such materials and ores by means of plumbates of the alkaline earths and hydrochloric acid; secondly, in the conversion of some of the constituent parts of certain description of ores into plumbates of lime and the after addition of hydrochloric acid thereto; thirdly, in the production of plumbates of the alkaline earths, and, fourthly, in the production of chlorine from plumbic salts.

In carrying this invention into practice I roast in ordinary furnaces the ores containing galena or other lead ore with carbonate of lime, or with ores containing same, and mix these two classes of ores in such proportions as to insure the production of plumbate of lime.

By "ores" above mentioned I mean such pyritic and auriferous minerals as do not permit of the extraction of their contained gold directly by amalgamation. The general type of such ores is one in which lead occurs in small quantity, as lead sulphide. The said sulphide is never in such quantity as to cause "caking" should it exist naturally, and where lead sulphide has to be added its admixture with $CaCO_3$ will prevent its caking.

To ores containing no lead or lime I add the necessary amount of lead or lime, or both, preferably at near the finish of the roasting. I may also produce the plumbate of lime artificially and independently and add it to the ores either during or after the roasting. The quantities of materials I propose to use are based upon the formula or equation

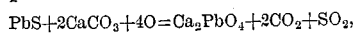
$$PbS + 2CaCO_3 + 4O = Ca_2PbO_4 + 2CO_2 + SO_2,$$

and by weight two and one-half parts of galena and two parts carbonate of lime would be found suitable. Other compounds of lead—such as oxides or carbonates—might be substituted for the sulphides, and oxides or carbonates of the alkaline earths and magnesia might be used instead of carbonate of lime, the result to be obtained being the production of the plumbate of lime. Having thus roasted the ores, so as to produce the plumbates of lime from its constituent parts, or some of them, or having added to the roasted ores the independently-produced plumbate of lime, I add to such ores, in an open or closed vessel, hydrochloric acid or sulphuric acid and chloride of sodium, as in the formula or reactions:

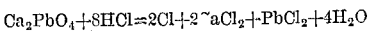
$$Ca_2PbO_4 + 8HCl = 2Cl + 2~aCl_2 + PbCl_2 + 4H_2O$$

or

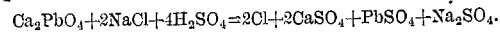
$$Ca_2PbO_4 + 2NaCl + 4H_2SO_4 = 2Cl + 2CaSO_4 + PbSO_4 + Na_2SO_4.$$

When to roasted ores I add the artificial plumbates of lime, I prefer to add, say, three (3) per cent., by weight, of the latter, and in the production of the chlorine I prefer to use acid of two to three (2° to 3° B.) degrees Baumé. By weight, three and one-half parts plumbate of lime require, say, three (3) parts hydrochloric acid (HCl) or, say, one and one-quarter ($1\frac{1}{4}$) parts chloride of sodium, and, say, four (4) parts sulphuric acid, ($H_2SO_4$.) Nascent chlorine is then generated and dissolves out the gold. By using weak acid, as above, I find that the generation of the chlorine is gradual and is distributed over some little time, and the acid is too weak to dissolve other oxides, such as oxides of iron and antimony, &c.

Having now particularly described and explained the nature of my said invention and the manner in which the same is to be performed, I declare that what I claim is—

1. The process of treating ores containing precious metals, which consists in roasting them and subjecting them to the action of plumbates of the alkaline-earth metals and hydrochloric acid, whereby chlorine is set free to combine with the contained metal, as set forth.

2. The process of treating ores containing precious metals, lead, and salts of alkaline-earth metals, which consists in roasting the ore, thereby converting some of its parts into plumbates of the alkaline-earth metals and adding thereto hydrochloric acid, whereby chlorine is set free to take up the precious metal, as set forth.

MAXIMILIAN JOSEF HARTUNG.

Witnesses:
FRED WALSH,
   *F. M. Inst. P. A., Sydney.*
THOMAS JAMES WARD,
   *Clerk to Edward Waters, Sydney.*